United States Patent [19]

Hull et al.

[11] Patent Number: 4,989,032

[45] Date of Patent: Jan. 29, 1991

[54] PROOF LIGHT

[75] Inventors: Frank A. Hull, Circle Pines, Minn.; H. Brent Archer, Miami, Fla.

[73] Assignee: Chesley F. Carlson Company, Plymouth, Minn.

[21] Appl. No.: 355,046

[22] Filed: May 16, 1989

Related U.S. Application Data

[63] Continuation of Ser. No. 19,182, Feb. 26, 1987, abandoned, which is a continuation-in-part of Ser. No. 834,897, Feb. 28, 1986, abandoned.

[51] Int. Cl.$^5$ ............................................. G03B 27/80
[52] U.S. Cl. ....................................... 355/38; 355/71
[58] Field of Search ......................... 355/32, 35, 38, 71

[56] References Cited

U.S. PATENT DOCUMENTS

| | | | |
|---|---|---|---|
| 1,703,449 | 2/1929 | Huebner. | |
| 3,157,087 | 11/1964 | Kallenberg | 355/71 |
| 3,279,311 | 10/1966 | Lichtner | 355/71 |
| 3,312,143 | 4/1967 | Karow et al. | 355/71 |
| 3,887,279 | 6/1975 | Rubin | 355/38 |
| 4,068,943 | 1/1978 | Gyori | 355/38 |
| 4,236,818 | 12/1980 | Fauchier | 355/38 |
| 4,371,259 | 2/1983 | Howitt | 355/38 |
| 4,565,441 | 1/1986 | Evans et al. | 355/38 |
| 4,657,378 | 4/1987 | Hope et al. | 355/38 |

Primary Examiner—Monroe H. Hayes
Attorney, Agent, or Firm—Dorsey & Whitney

[57] ABSTRACT

A phase-controlled, multi-color light is disclosed for proofing of colors before a job is run on a printing press. A controlled manipulation of the spectral intensity of red, green and blue light as exposed through various flats produce specific colors in proofing material. The proper exposure parameters or data are keyed into a computerized control which includes a number of printing process memories with each memory accepting a number of flats or films with a specific response for a given printing condition. This permits storage of frequencyly used conditions as well as modifications as desired. The color palette is also operator programmed. With such programming the combining of spectral values will result in a specific combined spectral value to create a specific color in the proof. Because of this procedure only one exposure is required for each of the cyan, magenta, yellow and black exposures to obtain the position and acceptance color proof of the color layout. Additional exposures can be added for cropping marks and cut and fold lines and to create a background color.

21 Claims, 26 Drawing Sheets

PROOF LIGHT

RELATED APPLICATIONS

This application is a continuation of 019,182, filed 2/26/87, now abandoned, which is a continuation-in-part of application Ser. No. 834,897, filed Feb. 28, 1986 and now abandoned.

MICROFICHE APPENDIX

A microfiche appendix comprising 2 microfiche and a total of 89 frames of software coding forms a part of this specification by reference hereto.

BACKGROUND OF THE INVENTION

The invention relates to a printing apparatus and process pursuant to which a light sensitive material such as color print paper is exposed to primary color lights, red, green and blue, through flats to simulate the desired printing ink colors of cyan, magenta and yellow. More specifically the invention is directed to an apparatus in which a single light sensitive material is exposed to the three primary colors through flats or films to obtain a composite color layout for proofing purposes so that the various positions and content of color produced by the flats can be proofed to be sure that an accurate composite color layout will be created from the flats.

Proofing of colors is a long established practice in the graphic arts industry. The printer wants to be sure that the final layout will have the correct shades of color in the correct location before exposing individual printing plates through the flats and running the job on a printing press. This proofing procedure has been very complex in the past. Prior art systems have conventionally used a large number of exposures. Past procedures have sequentially passed a red, green and blue filter past a single lamp or light source. Since various shades of cyan, magenta and yellow require contamination of the primary complementary color with the other colors, a typical procedure used in the past has been to expose the material through all three flats, sequentially using as many as three primary colors for each flat, thus requiring nine or more exposures for the position proof.

Naturally, the more light which is used to make each exposure requires closer and closer control of the specific time and intensity of each successive exposure. Also the spectral sensitivity of the emulsion is typically such that exposure through any one flat may lead to unwanted contamination of the color because of the overlap.

In addition, it is extremely difficult to maintain a uniform intensity of the light in that the intensity of lamps change as the light gets hotter or ages or the like. To add the black exposures, exposures for fold and cut lines and an additional exposure for background color increases the complexity and complicates the acceptability of the final position and color acceptance proof.

SUMMARY OF THE INVENTION

The disclosed proof light is a unique source of lighting with the objective of correlating log exposure values with the colors desired in a color proof. The objective is to make such proofing a rapid procedure with no more than ten seconds required for an exposure of a color and with no more than one exposure required for each color on the proof.

The proof light provides a phase-controlled, multicolor light source involving red, green and blue spectral values. A controlled manipulation of the three lights, with blending of the lights in a mixing chamber, creates a light source for exposure of the proof with a predetermined color of light determining the color values of the proof. The merged light, created from varying intensities of red, green and blue light, is projected through a one-half inch ($\frac{1}{2}$") source to a 45° mirror. The concentrated light is re-directed and distributed with light adequate for a 40 by 40 inch proof. A shutter control is provided for accuracy of exposure. The light is directed through a neutral density inverse cosine attenuator to create a perfectly uniform exposure over the entire proof.

A closed loop system with consistent monitoring throughout the entire system assures performance of the light. Spectral values of red, green and blue are measured and controlled by photometers. Three narrow bandpass filters are used that eliminate contamination of light experienced with broad band transmission filters. The result is optimum color values in proofing. This is an extraordinary flexible yet controllable light source.

Logarithmically controlled illuminance makes controlled exposure of proofs understandable in terms used throughout the color industry. Entries are in log exposure with a remarkable correlation of value to the color in the proof. This results from the linear relationship between the logrithmic control and the color response of the proof paper. Added to this is the phase-control feature of the light. Unlike ordinary exposure lights, the light has a fixed exposure time and modifies intensity of the lights logarithmically. There is no reciprocity failure problem. The colors of the proof will reflect accurately the programmed color of the light source.

The color palette of the light is operator programmed. An insert pocket holds reference for nine programs with six colors each. Pre-programmed exposures for major accounts may be stored and totally recalled with simple pressure on the selected number. Programs for up to ten emulsion speeds may be entered and stored for modification of any of the color programs. Emulsion speed is in logarithmic value. Compensation for added overlay densities is keyed in by the operator. Included in the operating program is an automated draw-down of vacuum to assure full contact before exposure begins to simplify necessary action in the darkroom environment.

The console is designed for accurate and rapid entry of color and emulsion programs. The console is designed to provide a flat surface for easy and secure positioning in the darkroom. The message display panel is angled for easy reference. Underlying the surface of the panel is a carbon shield to protect the circuitry from static electricity constantly present from the placing and lifting of films. The surface is a smooth membrane with resistance to wear and with easy movement of fingers over the surface. All keys have a phosphorescent backing for easy-to-see use. The LED lighting is easily read but will not expose the proof.

The following are objectives of the invention:

Logarithmically controlled illumination that gives a linear relationship of light to the color response in the proof.

Phase control of light for precise control of light intensity and color with a fixed exposure time. No reciprocity failure problem.

Entry of all data in log exposure values the language of color reproduction.

Speed of exposure is a fixed time period with only one exposure required per color. A four color proof requires only four exposures.

Keys of console nicely proportioned and spaced for certainty and ease of entry.

Console designed for easy positioning in darkroom.

Log photometric, closed-loop control for red, green and blue light.

Narrow bandpass filters for clarity of color and freedom from contamination of color value.

Mixing chamber for blending of red, green and blue for specific spectral values.

Inverse Cosine filter to assure uniform lighting over entire proof.

Small, one-half inch light source to assure sharpness of image.

45° angle mirror which will reflect light to a 40 by 40 inch proof with light at 8 foot height and frame at 32 inches.

Adjustment of sliding leafs to control light distribution solely to surface of vacuum frame.

Flat console with smooth membrane surface. Phosphorescent backing for keys. Keys grouped and dispersed for easy use in darkroom operation.

Message Display Panal angled for easy and quick reading.

LED displays that will not expose proof.

Permanent memory. Programs will not be lost if power is lost or turned off.

Room light termination to provide easy working condition prior to placing paper on frame.

Insert panel for identification of programs.

Addition of overlay densities to exposure with no effect on results.

Sequential messages to advise operator of progression of proof.

These and other objectives and advantages of the invention will become apparent to those skilled in the art upon a review of the following description of the preferred embodiment and the claims and drawings appended hereto.

DESCRIPTION OF THE DRAWINGS

FIGS. 7 and 7a–7i are a schematic diagram of the master board containing the microprocessor and logic components.

FIGS. 8 through 14 are flow diagrams of the software used in connection with the invention.

DESCRIPTION OF THE PREFERRED EMBODIMENT

Figure 1:
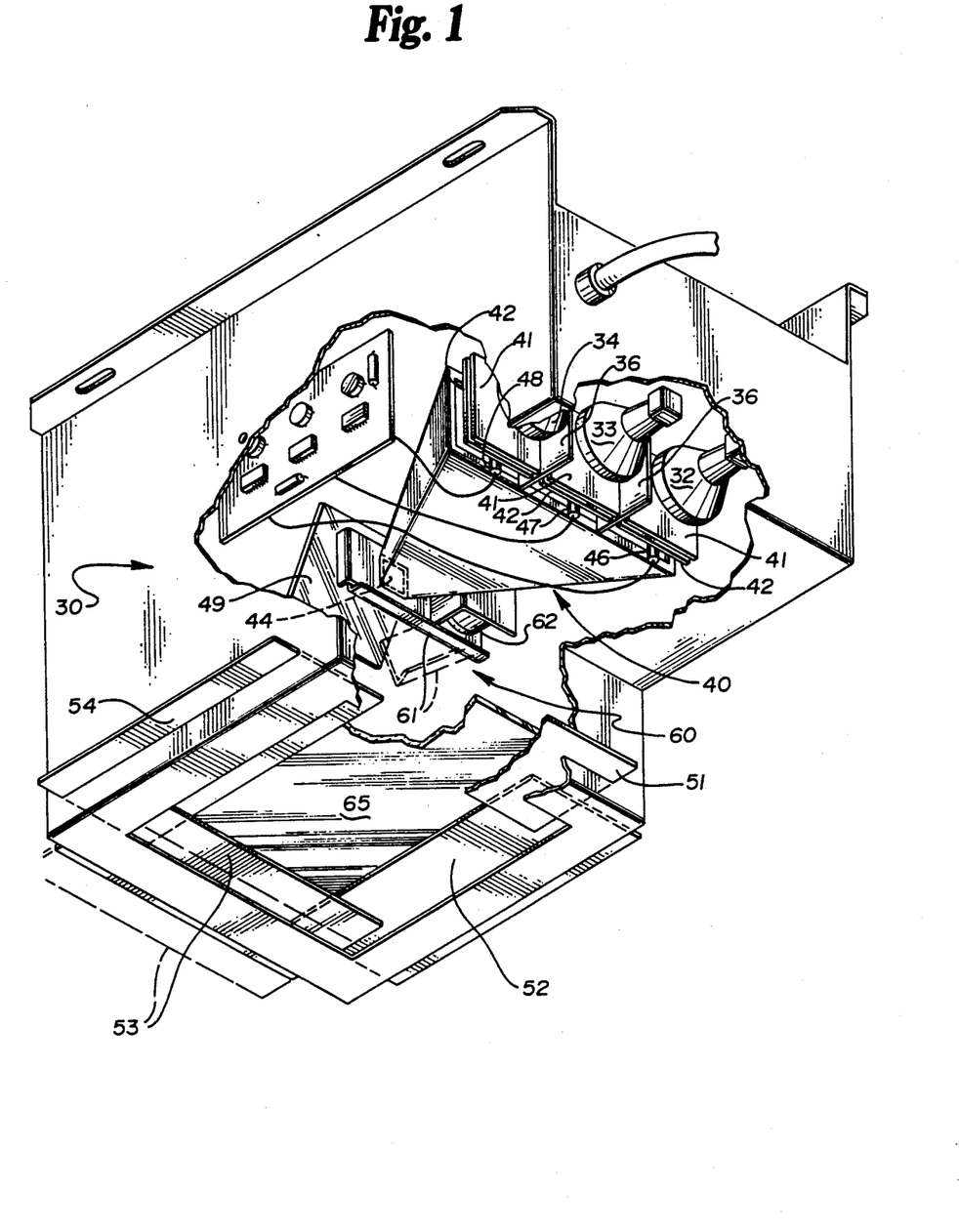
FIG. 1 is a perspective view of the light box which integrates and measures the intensity of the red, green and blue lights which are used for exposing the emulsion through the various flats. The view is partially broken away to show the interior of the light box showing the lamps, the lamp partitions, the integration chamber, the 45° mirror, the photodiodes with associated circuitry which is used to control the light sources and the shutter and the controlled aperture obtainable with the light box.

Shown in FIG. 1 is the proof light 30 of the instant invention. If suspended from an 8 foot height or ceiling, it is designed to project light to various size proofs up to a maximum of 40×40 inches contained in a vacuum frame (not shown) having a 34 inch height. It will be obvious to those skilled in the art that a variation in the heighth of the light and the heighth of the vacuum frame will vary the maximum size of proof that can be accommodated by system.

Figure 2:
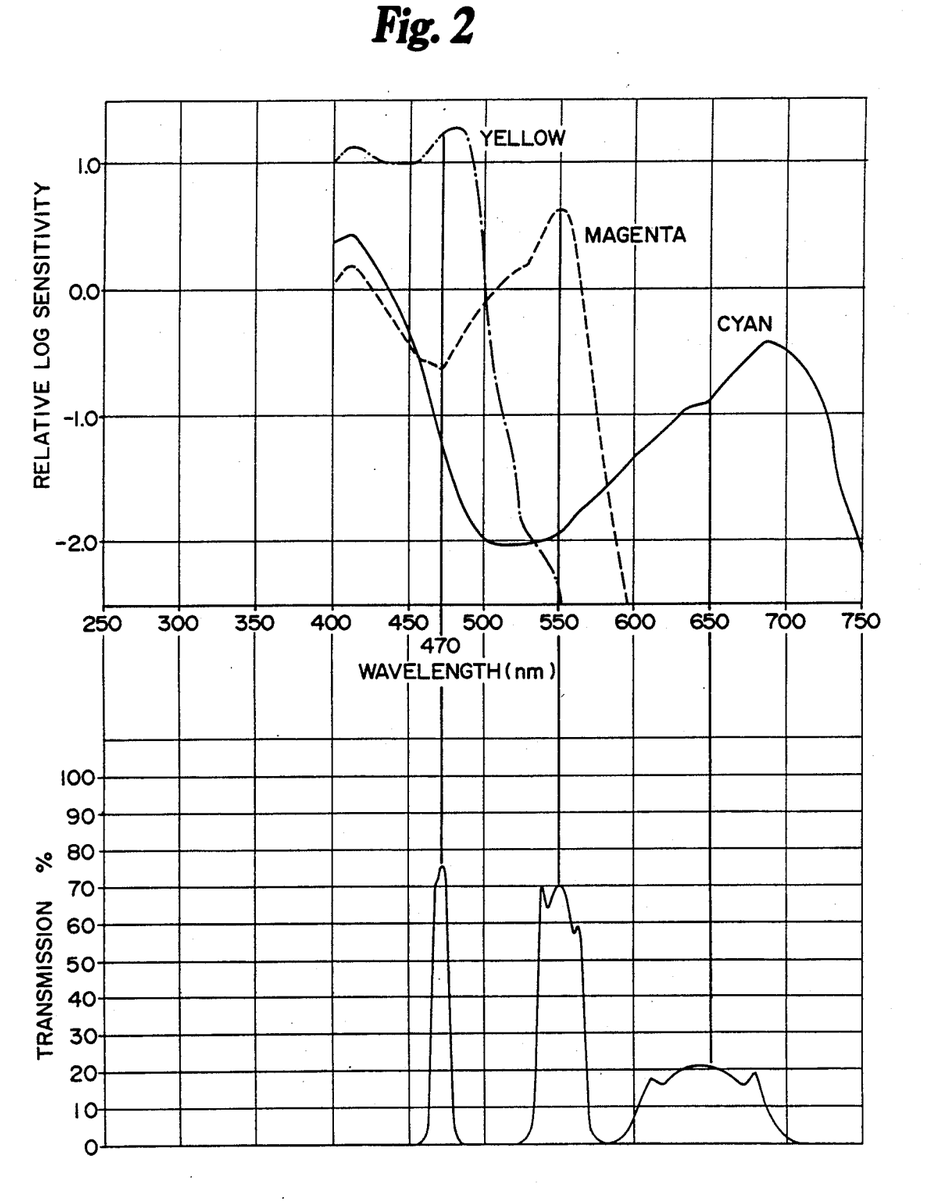
FIG. 2 shows the spectral sensitivity curves of a typical emulsion such as color print paper. Also shown is the spectral response of the narrow bandpass filters which eliminates contamination by nonselected colors.

The configuration of the inside of the light box is shown in the Figure. In the top of the light box three eighty-two volt lamps 32–34 are used which are nominally operated at 20 to 80 volts. As shown, partitions 36 are used to separate the lamps 32–34 one from the other so that the intensity of each is directed into the integrator 40. The integrator 40 or light tunnel has a neutral interior surface and interposed between each lamp and the integrator is an infra-red filter 41 and a very narrow band color filter 42 to produce a red, blue or green light source. The spectral response of representative narrow bandpass filters are shown in FIG. 2 having a bandwidth of ten nanometers for blue, eighty nanometers for red and thirty nanometers for green. Such filters are commercially available from the Omega Corporation. The use of a very narrow band filter 42 eliminates the effect of overlap of spectral response of the emulsion. It also enables the intensity of the lamp to be maintained since only a very narrow band of response is selected to essentially negate the differences in response between a lamp that is heating up, cooling down, aging or the like.

At the outlet of the light mixer or integrator, a diffuser 44 is provided. Three photodiodes 46–48 are preferably attached to the filters to detect the variable intensity of the lamps 32–34. The diodes 46–48 can also be provided with encapsulated red, green and blue filters and be placed adjacent the diffuser 44 or penetrate into the interior of the integrator 40 for the same purpose.

The light is directed onto a 45° mirror 49 to project it onto the frame. At the diffuser a shutter mechanism 60 is provided, shown in FIG. 1. The shutter 61 is operated by a rotary solenoid 62 and software to be discussed below. Below the mirror 49 a neutral density filter 65 is provided which is a halftone pattern laminated in plastic which has been exposed to accommodate the acceptance angle and cosign law of the film and for the fall-off of the light. In other words, the attenuator 65 has a higher density in the center of the plate and a lesser density around the outside periphery of the plate so that the intensity of the light which falls upon the film is substantially uniform.

Below the attenuator are four plates 51–54 which are slideably provided in slots to provide a controlled aperture. In this manner, light directed from the light box 30 towards the vacuum frame will be directed solely to the vacuum frame and will not affect the exposure by bouncing off the operator's shirt, the walls and the like.

Figure 4:
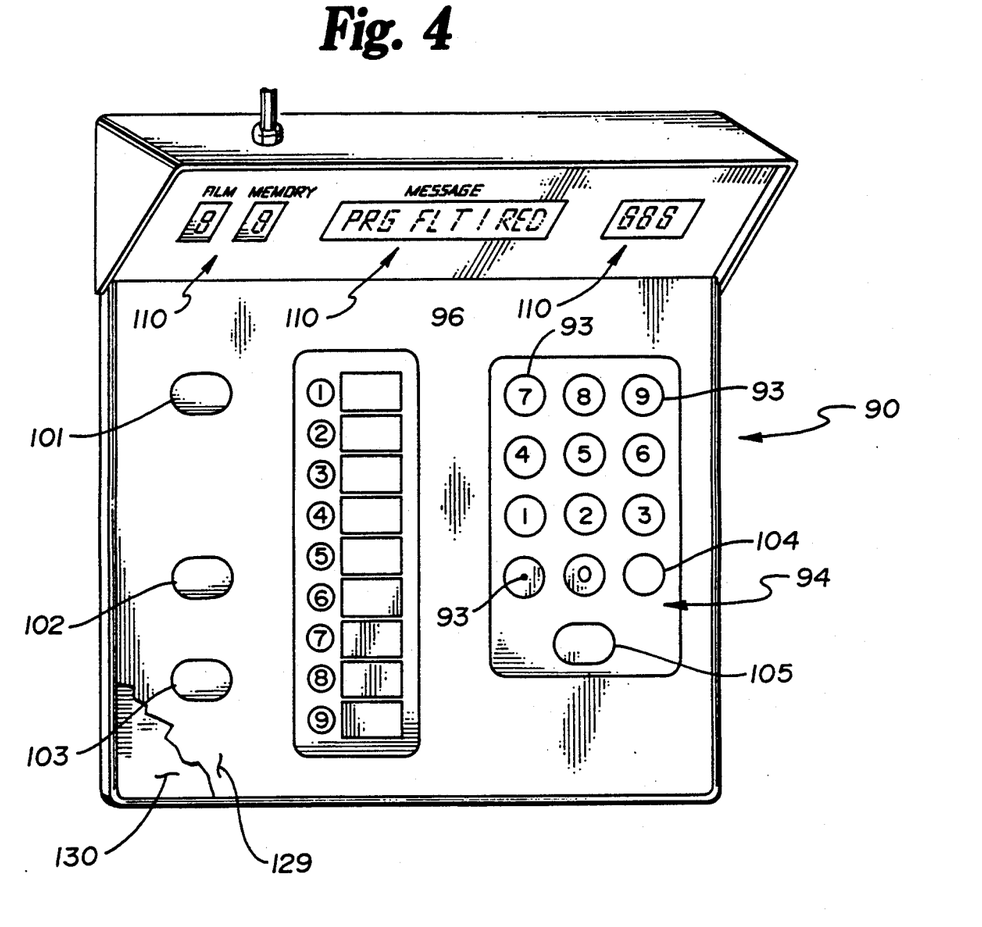
FIG. 4 shows the operator console and various control keys used in connection with the invention.

Shown in FIG. 4 is the operator console 90 which provides the user with an interface to the system. Numeric keys 93 on a key pad 94 and memory portion 96 as well as operator function keys, speed 101, cycle 102, start 103, clear 104 and program 105 are phosphorescent to enable the operator to see the keyboard 90 with a minimum of light being emitted to affect the emulsion. Red, low power LED displays 110 are also used to identify the film, memory being accessed, the program position i.e. which flat is being exposed, and the like and the last numeric entry. The console 90 is structured so that the LED displays 110 are angled away from the film and further shield the keyboard displays 93, 96, 101-105 to be sure that the console 90 does not create a light source which might affect the exposure. As shown, a carbon anti-static layer 130 is interposed between the surface layer 129 of the console 90 and the key pad contacts to protect from static electricity since movement of overlays and plastic sheets during the exposure process creates large amounts of static electricity.

Figure 5:
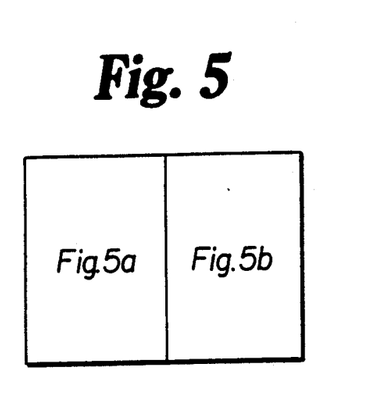
FIGS. 5, 5a and 5b are a schematic diagram of the photometer board.
Figure 5A:
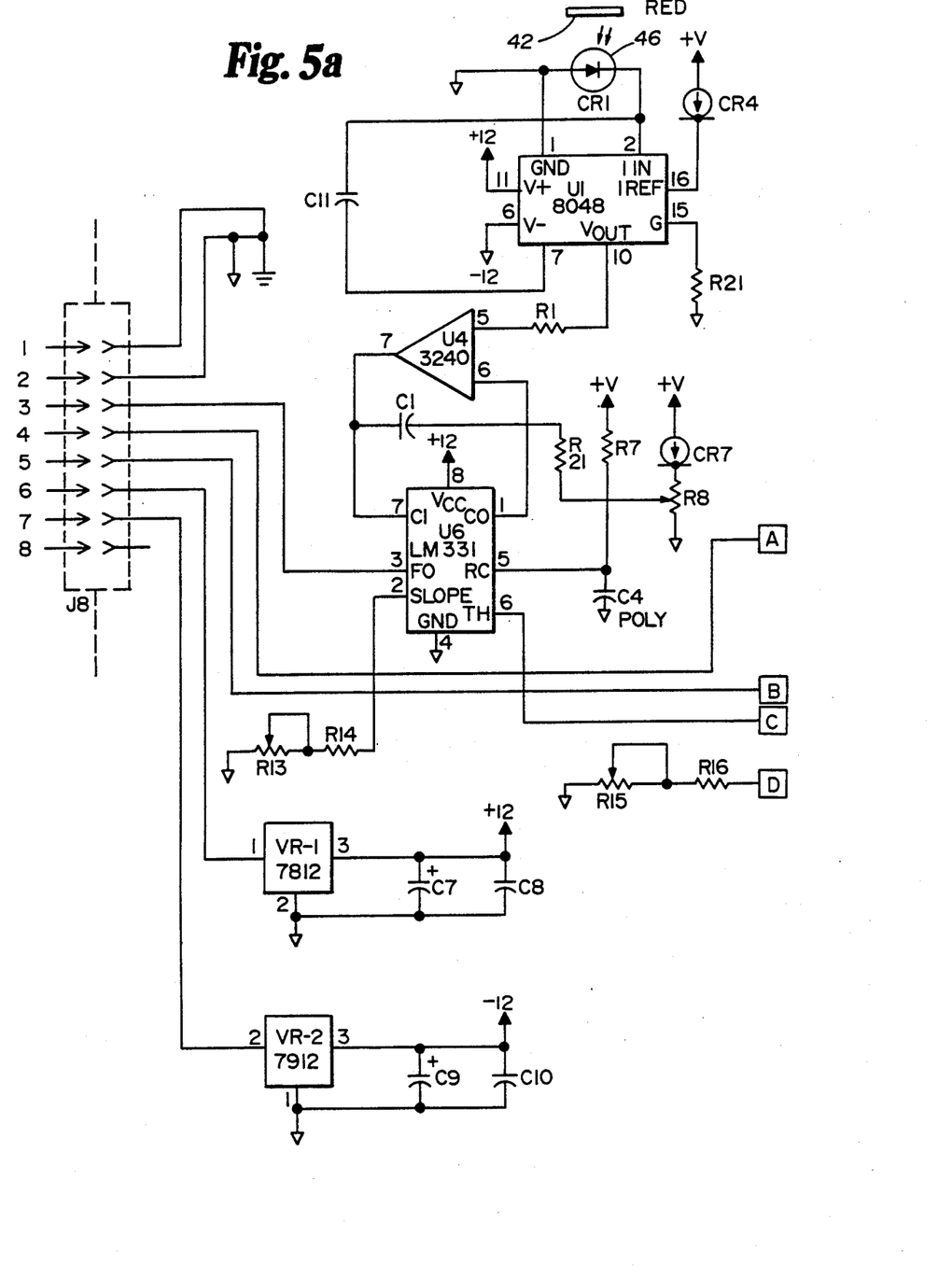
Figure 5B:
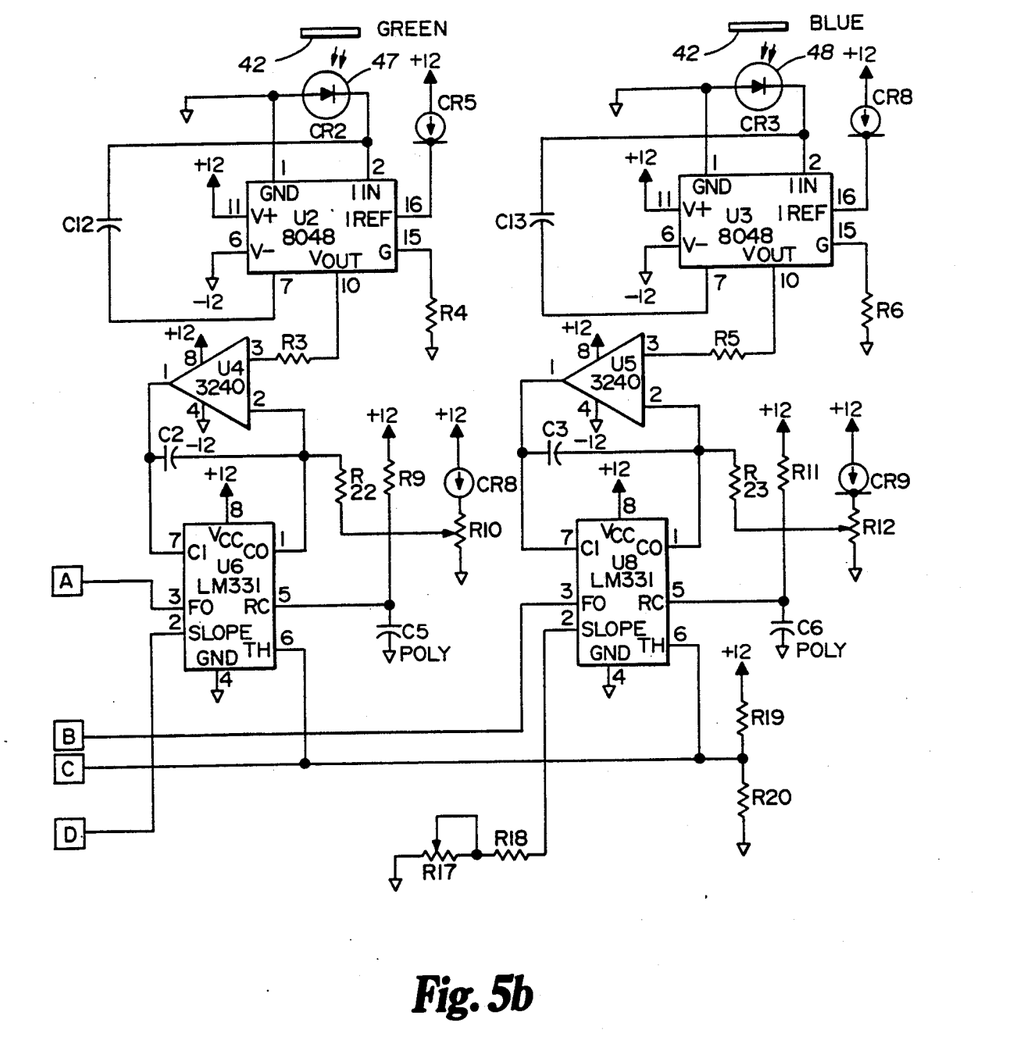

Referring to FIG. 5 the photodiode detection and conversion circuitry is shown. A photodiode 46, 47, 48 is positioned immediately adjacent each of the red, green and blue narrow band filters 42 to detect the amount of light which is passed through the filter 42 into the integration chamber 40. The current through the diode is directly proportional to the light intensity. Current from each diode 46-48 is connected to a log amplifier U1-U3 such as that manufactured by Intersil Corporation and designated 8048. Also connected to each log amplifier U1-U3 is a reference current on pin 16. The reference currents are used to balance the dominance of the colored light from the lamps 32-34. It has been found that a one milliamp reference current for the red lamp and 0.33 milliamp currents for the green and blue lamps produce a balanced output. The output of the log amplifiers are logarithmic and are preferably connected to three CMOS operational amplifiers U4, U4 and U5 which buffer the signals so that the switching transients of the voltage to frequency converters U6-U8 do not affect the output. The output of each operational amplifier U4, U4 and U5 are connected to a national semiconductor LM 331 voltage to frequency converter U6-U8.

Also connected to the voltage to frequency converters U6-U8 are offset controls, R8, R10 and R12 and gain controls R13, R15 and R17. These controls are set during calibration of the machine to be sure that the slope and offset of the light sources match the logrithmic scale. Plus and minus twelve volt power supply regulators are also shown in FIG. 5.

Figure 6:
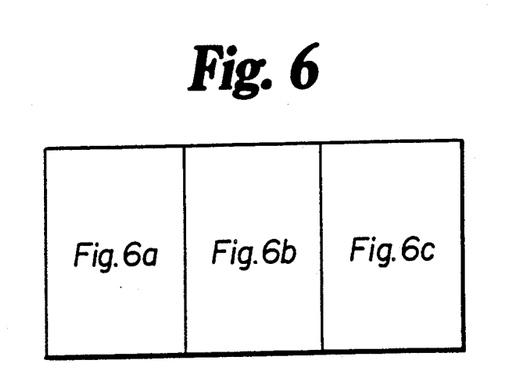
FIG. 6, 6a, 6b, and 6c are a schematic diagram of the displays and keyboard used in the operator control.
Figure 6A:
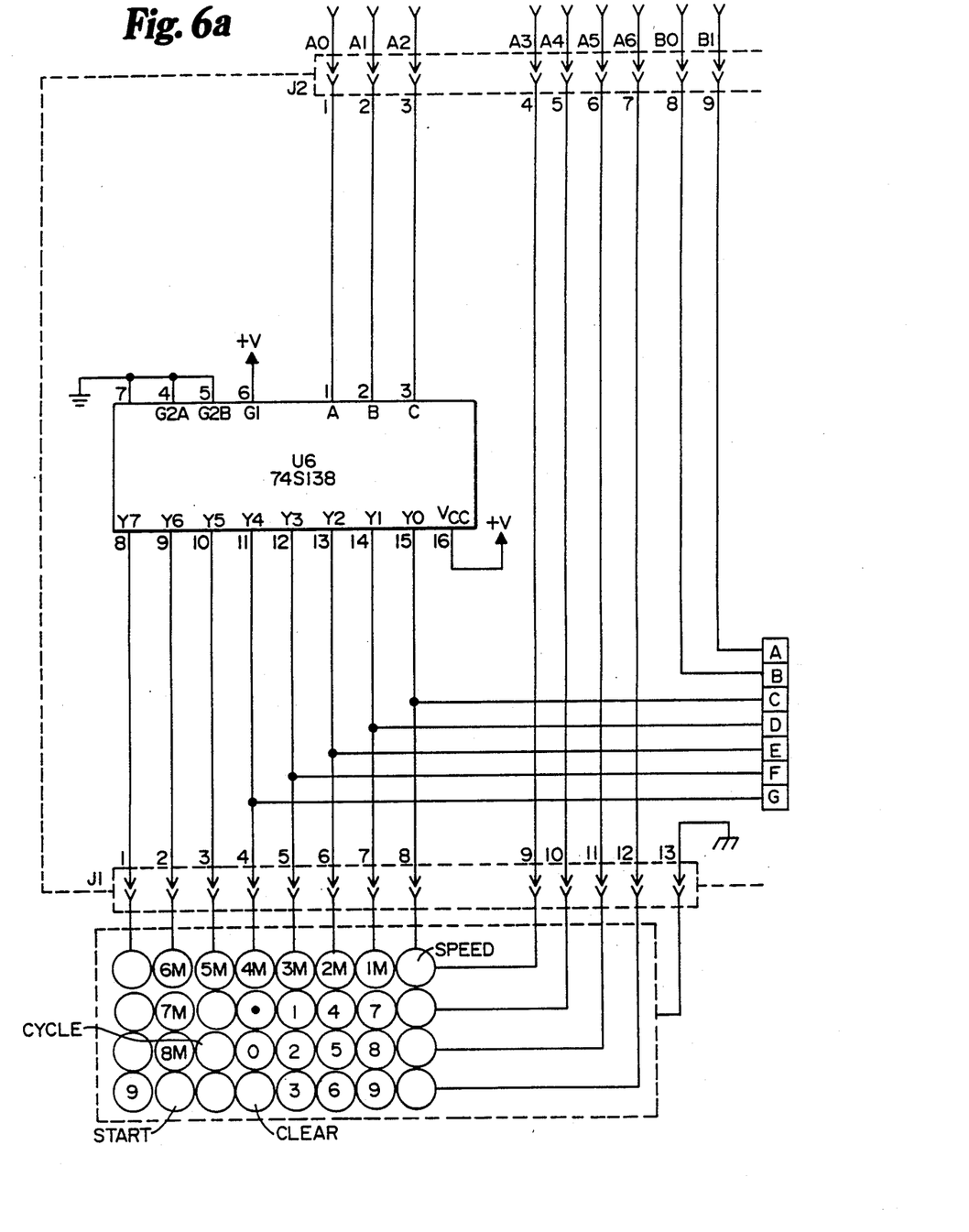
Figure 6B:
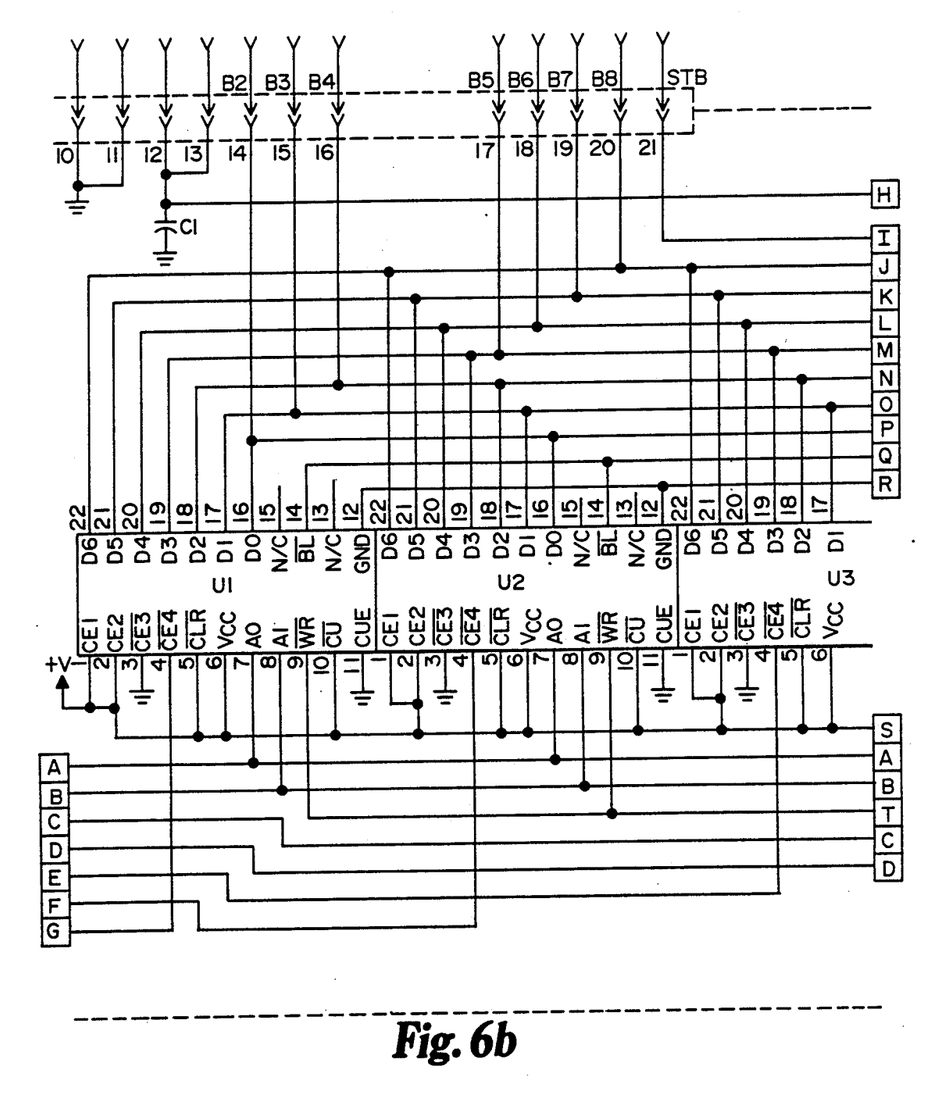
Figure 6C:
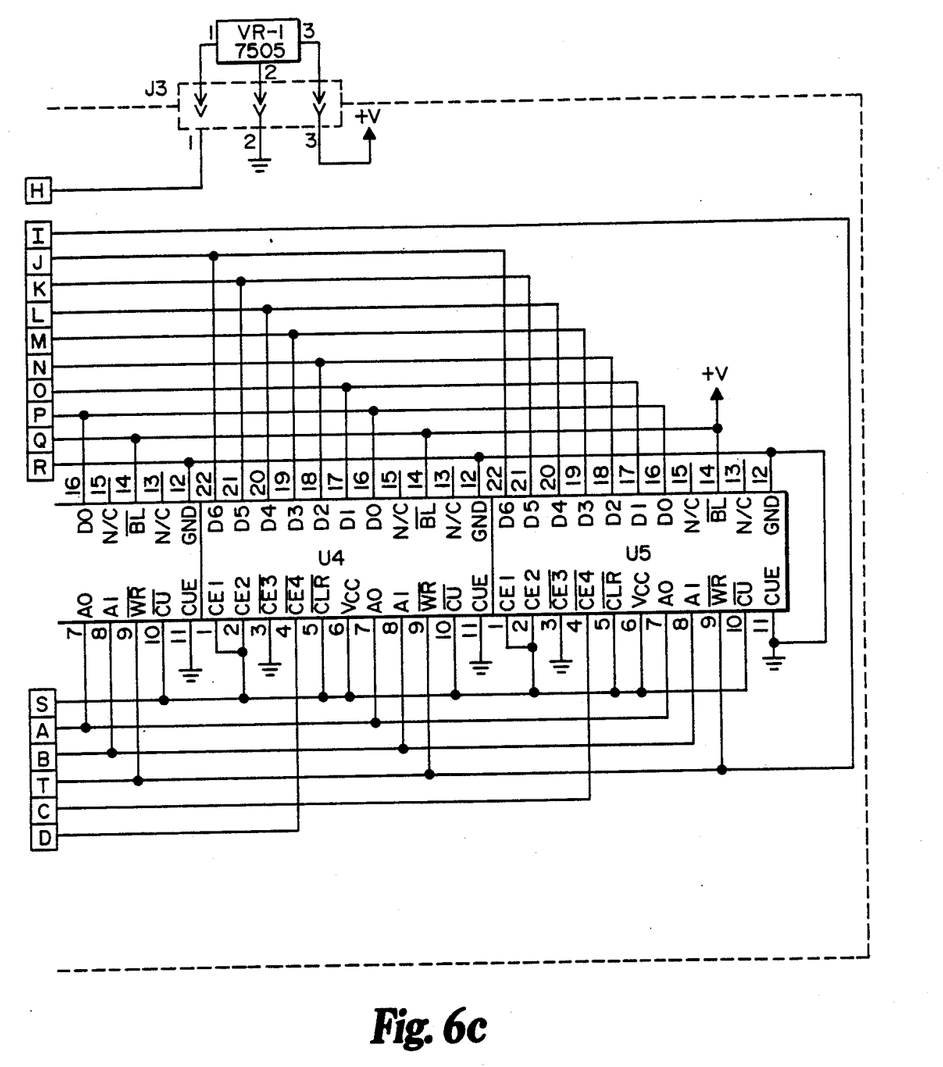

Referring now to FIG. 6 the display board for the electronic console 90 is shown and can be understood.

The alphanumeric displays 110 across the top of the console 90 are created with the use of five Litronics four character alphanumeric displays, U1-U5, manufacturer's designation DL 3416. A four by eight keyboard array 95 is also shown which is sequentially multiplexed to determine key depressions. All operator controls 93, 94, 96, 101-105 are connected to the keyboard array 95.

A National Semiconductor three to eight decoder, U6 manufacturer's designation 745138, is used as a keyboard 95 decoder and also runs the displays 110.

Operation of the display 110 with the three of eight decoder U6 involves three inputs. The display 110 to be activated is sent by a three bit binary code on input lines A0, A1 and A2. Decoder U6 outputs Y0-Y4 select one of the five LED display chips 110. The alphanumeric characters to be displayed are connected to the displays in ASCII code on input lines B2-B8. Input B0-B1 are used for addressing. Finally, a write strobe is connected to input pin 9 of the alphanumeric display chips U1-U5 to enter the character.

The three to eight decoder U6 is also used to multiplex the keyboard 95 when the displays 110 are not being selected or run. The binary input A0-A2 is connected to the eight rows of the keyboard array on outputs Y0-Y7 of the three to eight decoder U6 and a low signal detected in the columns of the keyboard 95, on lines A3-A6 identify, in conjunction with the input, which key is depressed.

The data input on lines B0-B8 both address and connect the proper character to the alphanumeric displays 110. Bits B0, B1 are used with binary code to select which character is going to be displayed and the six bit ASCII code is used to identify the particular character.

Figure 7:
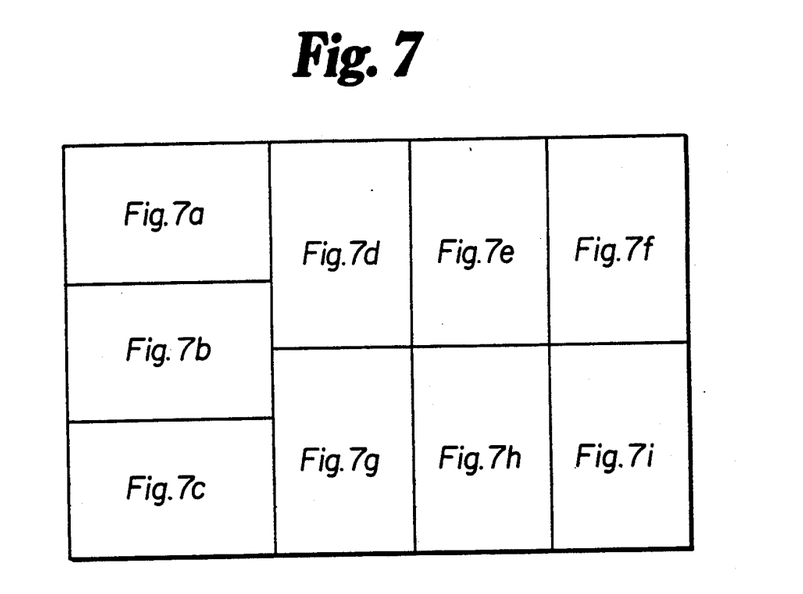
Figure 7A:
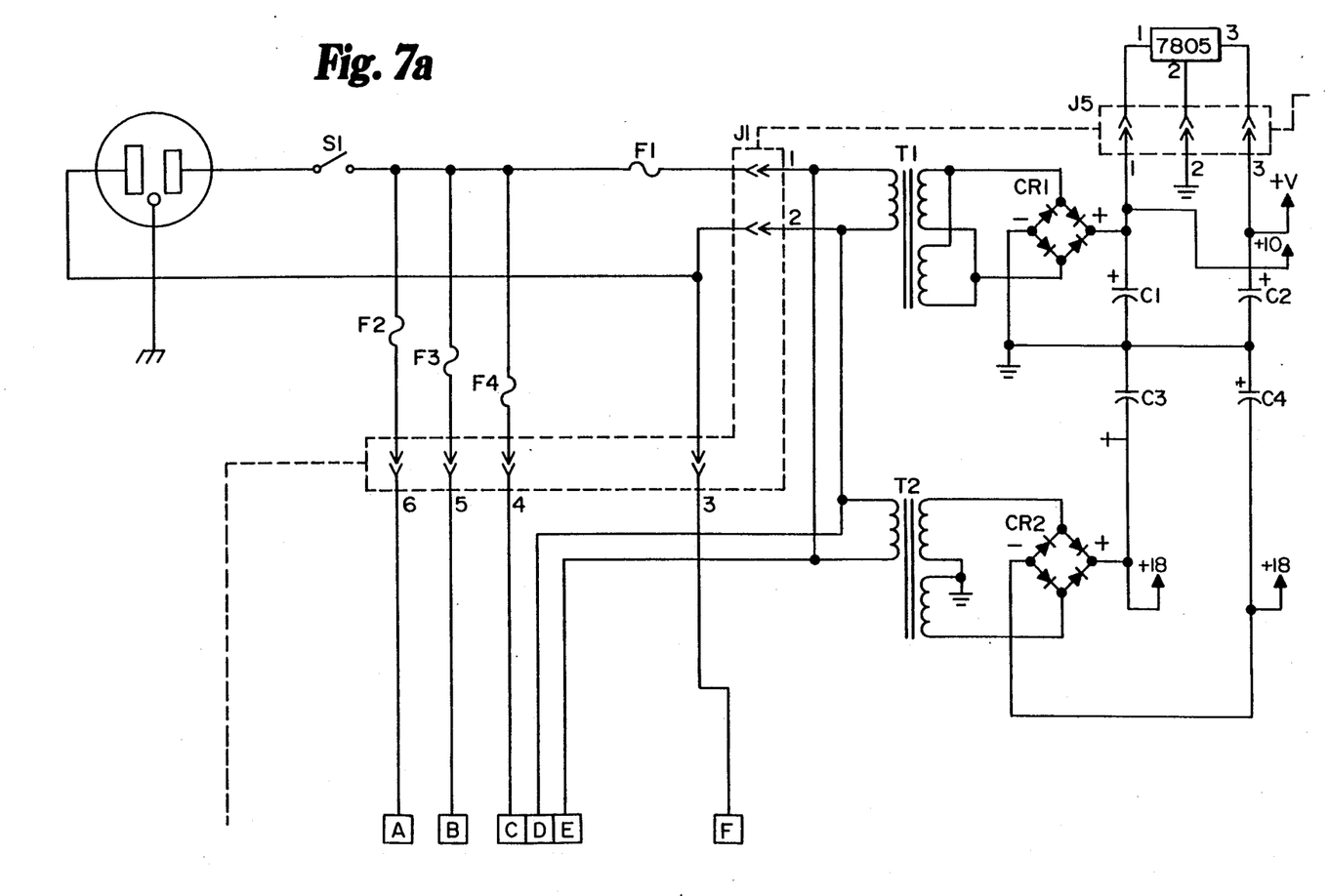

Referring now to FIG. 7 the microprocessor control of the apparatus can best be understood.

As shown in FIG. 7, the unit preferably utilizes a Motorola 6803 microprocessor U4. Control signals are connected to the input or left side of the microprocessor U4. On the output side or right hand side of the microprocessor U4 are the multiplexed, data and address lines.

The microprocessor U4 sequentially cycles address and data bits. The appropriate address to be accessed, determined by software routines to be discussed later, is connected from output lines A8-A15 through a demultiplexer or latch U5. The address bits are followed by data bits on output lines D0-D7. Consequently, on microprocessor U4 cycles the address is latched and the data is connected to the data bus on the subsequent cycle of the microprocessor U4. On the input or left hand side of the microprocessor is a four megacycle clock crystal on pins 2 and 3 followed by an input referred to as nonmaskable interrupt (NMI). The nonmaskable interrupt is used to detect zero crossing of the 60 cycle input for purposes to be discussed below. On pin 5 is the external IRQ input. This can be connected to a color densitometer (not shown) and used to receive voltage to frequency pulses from the color densitometer for the purpose of conversion to density. Alternatively, the densitometer can be connected to pins 23 and 24 of the Serial Communications Interface (SCI) input, U8. It should be noted that with the components shown five interrupt requests (IRQ signals) are available, one external IRQ used for color densitometer, two microprocessor U4 internal timer interrupts, one of which is used as shown in FIG. 14, and two communications interrupts.

On pin 6 is a reset input. Input pins 8-10 are used for mode selection and input pins 13 through 15 are used for a densitometer input which can be used instead of operator input on the key pads 95.

Since all counts are based on the zero crossing of the sixty cycle power which energizes the lights, the nonmaskable interrupt connected to pin 4 is handled immediately by the microprocessor U4 every time it occurs. The nonmaskable interrupt is driven by a zero crossing circuit consisting of a CMOS operational amplifier U3-A which receives the 120 volt 60 hertz signal from the line. Using input dividers and gain control, the input signal is shaped into a 60 hertz square wave. The output of the operational amplifier U3-A is connected to two integrating capacitors C22 and C23. The charge cycle of both capacitors C22 and C23 are clamped at their 50% charge using diodes CR10 and CR11. This produces a high going pulse into the plus input of operational amplifier U3-B and a negative input into the minus input of operational amplifier U3-B to provide a symmetrical edge detector of the 60 cycle input. The output pulses, identifying zero crossing, are amplified with an 3240 amplifier U3-B and connected to input pin 4 of the microprocessor U4.

The reset generating circuit 120 is controlled by a comparator U14-A which compares the unregulated voltage to regulated voltage. Whenever the unregulated voltage gets within two volts of the regulated voltage the CR5 will be fired to generate a reset through the system to lock the system down. Therefore, when the unregulated supply, which is normally at about ten volts drops to as low as seven volts the reset is generated which locks out the random access memory U6, the processor U4 and the counters U11, U12. All data stored in those areas are then stored by battery backup BTY1 and not destroyed as would normally happen when power is taken from a RAM.

Also included in the reset circuitry is a delay circuit 122. The delay circuit 122 holds the reset line low until power is fully up. The delay is controlled by the amount of charge on capacitor C17 which is delayed by the RC time constant of resistor R21 and capacitor C17. Once power is at full power and the capacitor is charged, the 6803 microprocessor U4 is reset and the system is at full power operation.

Ports 20-22 of the microprocessor U4 are used to set the operating mode of the microprocessor U4. As shown, the microprocessor U4 is operated in the expanded multiplex mode to provide an external data and address bus.

Output Ports 10-12 are used to select up to eight different color filters in the densitometer input. As the binary pattern shifts on pins 13-15, the densitometer switches through broad band and narrow band red, green, blue and visual filters. The broad band filters are used to read the color originals so no information is missed. The produced color in the proof is read with the narrow band filters.

Ports 14-17 on pins 17 through 20 control the peripheral components of the system. This includes an outlet which controls the room lights which are switched off before an exposure is begun. The vacuum pump for the vacuum frame is also switched on before starting an exposure. A fixed time period is provided to enable enough time for the vacuum to be drawn before the exposure has begun. A shutter control is also connected to the microprocessor on port 16, pin 19, so that the lamps within the light box come up to an established level before the shutter opens for exposure and a fixed exposure time interval is also provided to control reciprocity error. A watchdog circuit U1, discussed below, is connected to port 17 through a flip-flop U14.

Also connected to the microprocessor is an 8K by 8K CMOS RAM U6 using low power consumption. Since the battery backup circuit 130 continues to power the RAM U6 when the power is off, low power consumption is important so that the batteries BTY 1 are not drained. Also connected to the microprocessor U4 is a 2764 read only memory U7 which contains the software discussed in connection with FIGS. 8-14 and which is attached hereto as an appendix.

Connected to the VCC input of the RAM is a transistor Q4 and the rechargeable power down battery BTY 1. When the power supply drops below the battery voltage the battery BTY 1 is switched in. The circuit 130, with current limiting resistor R10 also provides a rapid recharge of the battery BTY 1 when regulated power is returned to the circuit.

Also connected directly to the microprocessor U4 is the address decoder U9. The three most significant lines A13-A15 generate chip select. Four thousand byte pages of memory are therefore allocated by demultiplexing. The least significant bits A0-A12 identify RAM U6 and ROM U7 address locations. Chip select includes the RAM, the ROM, the counters and the input output port U8.

The input output port, U8, Motorola chip designation MC 6821P under processor U4 control drives the display 110 and keyboard 95. Lines A0-A2 address the 3×8 decoder U6 and lines A3-A6 constitute the key return from the columns of the keyboard 95. Connected to line A7 is a beeper 132 associated with the key pad so that a beep is made on each key stroke of the key pad. Similarly, outputs B0-B7 control the alphnumeric display with output CB2 providing the write strobe.

Counter U11, Motorola designation MC 6840 is the photometer counter. Initially the count is set at hex count FFFF and as the photometer pulses come in they decrement the counter. After the photometer pulses are read, the FFFF value is subtracted from the count to yield the actual photometer count. The microprocessor U4 reads the counter U11 via the address and data bus and resets it to FFFF. The photometer input is connected to the counter on J7.

Counter U12, also designated 6840 by Motorola, which is interconnected with a quad-output flip-flop U14, Motorola chip designation MC 4043, is the phase control counter or phase timer. Three counters are used in the counting chip U11 and three corresponding flip-flops are used in the flip-flop chip U14. The count which corresponds to the time that each lamp is to be deenergized is loaded into the counter U11 via the microprocessor U4, address and data lines. In other words, on a one megacycle clocking rate, a count of one would be loaded if the lamps were to be fully energized for a full half cycle of the 60 hertz lamp voltage. 8333 counts would be loaded if a lamp was to be fully de-energized during a full half cycle of the 60 hertz power to the lamp. Pursuant to the software routines a relatively high count is initially loaded into the counters so that the lamps can be warmed up. After a number of cycles, an actual count is loaded into the counters based on the data input by the operator and the actual intensity of the lamps as measured by the photometers. The initial warm up of the lamps can take place while the vacuum is being drawn on the vacuum frame.

The flip-flops are set at the zero crossing, causing the counter U11 to begin counting. When each counter times out, that is, reaches the prescribed count the corresponding flip-flop is reset causing it to emit a pulse on the R0, R1 or R2 outputs each of which is connected to a separate driver U2A, B and C and through the driver U2-A, B and C to a transformer $T_3$, $T_4$, $T_5$ to fire a triac MAC 1-3 which causes the respective red, green or blue lamp to be energized during the remaining portion of the 60 cycle power wave form.

A watchdog circuit U1 is also provided with transistors Q1 and Q2. The watchdog U1 must be reset every 10 milliseconds by the microprocessor U4, to be sure the microprocessor U4 is operating correctly. When the watchdog U1 is cycled or reset, its output goes high to turn on the transistor Q1 which supplies the voltage to the transformers T3-T5. If the watchdog U1 does not recycle, no power can be connected to the transformers T3-T5 and consequently, the triacs MAC 1-MAC 3 cannot be fired and the system will shut down until the microprocessor U4 is shut down, cleared and begins operating correctly.

Figure 3:
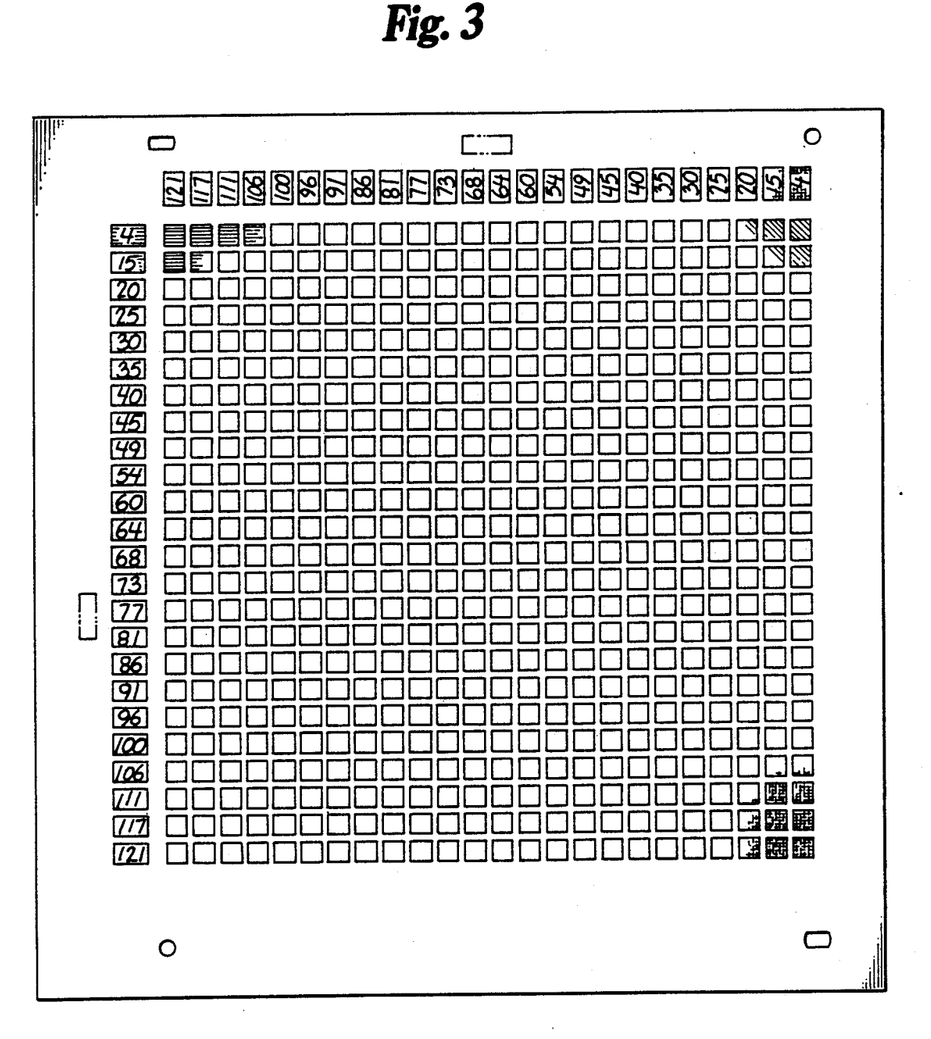
FIG. 3 shows the cross hatched color grids which are used to determine recipes for recreating colors. Each grid may be created from two of the three primary colors from 0.0 to 2.0 density.

Operation of the invention can be understood with reference to the operator's console shown in FIG. 3 and the software routines which are attached as FIGS. 8 through 13 in conjunction with the programs which are attached as the appendix and incorporated herein by reference.

A primary objective of the invention is to minimize the amount of time and effort required by the operator to expose a single light sensitive emulsion such as Kodak Ektacolor Plus Paper, Fuji Color Print Paper, Agfa-Geavert Color Print Paper and the like, for position and color acceptance proofing and evaluation of complex process color work. The invention allows a single exposure for each of the four flats normally used for four color work. The operator may add cut and fold lines and a background hue, two additional flats, again each requiring a single exposure, to complete the job.

To achieve this result the invention must be programmed for each flat and each desired shade of the secondary colors. Consequently, the memory of the device is currently structured to accept nine different job conditions. It will be clear to those skilled in the art that more or less job memories can be established.

As is obvious from the software routines attached as FIGS. 8 through 14, most routines are in a program mode or an operational mode. If the program routine is selected, the console obtains programming data from the operator which is stored in memory and then used during actual exposure of the flats.

To obtain the "recipe" for the color, two methods or procedures are available for use. In one method, the actual color, that is the component values of the colors are determined with an input densitometer which can be connected to input pin 5 of microprocessor U4. Color control is achieved with the selection of broad band filters from output ports 10–12 as explained above. An alternative method is available when a color densitometer is not used. This procedure uses color grids 201, 202 which are shown in FIG. 3. When creating the grids, a piece of film is exposed with a red light only creating a gray scale that goes from zero to 2.0 density in 0.05 density increments. After the red exposure is completed, the film is rotated 90° and exposed with green light. This creates a large square color pallet 201 which varies from no exposure to maximum exposure of the two primary colors. Similar grids are created with green and blue exposures and red and blue exposures. A black exposure 202 is similarly created in a single dimension.

In the first grid discussed, the red light will give the cyan color and the green will produce magenta. Using a knife or punch the center may be excised from each color wedge. Thereafter, the actual color that is to be reproduced may be determined by simply laying the appropriate grid over the color to be proofed. The grid is shifted until the best color match is obtained between the original and grid. Assuming a maximum exposure of 250 to create the grid if the color match occurs at 0.2 red and 0.4 blue, cc values of 230 red and 210 blue can be used for the recipe for the actual exposure for proofing purposes. Other methods will be obvious to those skilled in the art. For example, a small hole may be punched in the color sample to be matched. This can then be repositioned over the crossed wedge image 201 until the best match is found. Or a hole can be punched in a piece of paper and both the color grid 201 and color sample compared until a match is found.

Referring now to FIG. 4, which shows the programming console and the flow charts of FIGS. 8–14 programming and operation of the invention can be understood.

When the power switch is turned on, the displays 110 should be blank. This display condition is referred to as "stand-by". In stand-by the proof light 30 is ready to accept commands. There are four basic commands, program 105, memory number 96, speed 101 and clear 104. Other accessible controls as shown in FIG. 4 is the start button 103, the cycle button 102 and the numerical keys 93.

To execute basic commands the appropriate keys 95 are depressed while in stand-by. The software routines are executed with a number of flags, counters and registers. The flags used in the software routines include program, exposure, clear, done, memory, speed, calculate and vacuum. The counters are a delay counter, color counter and a flat counter. The registers used are for the red exposure, the green exposure, the blue exposure, binary coded decimal (BCD), the memory number being programmed or accessed and the film number. These are typically displayed with the LED displays 110 at the top of the console.

The majority of the time the software operates in a scan mode 300 shown in FIG. 14. With the scan mode 300 the microprocessor U4 reads the keys 302 and if any are depressed 306, it looks up the key routine 308 and jumps to that routine 309. If no keys are depressed 304, it continues to scan.

To program a vacuum delay, normally the first action taken, the program key 105 is depressed, the start key 103 is depressed and using the numerical keys 93 the number of seconds of vacuum delay are entered. Referring to FIG. 13, depression of the program key 105 clears a number of flags 312, sets the program flag 315 and causes the LED display 110 to display "PRG" 317 and returns to the scan routine 319.

Referring to FIG. 8, depression of the start key causes the software to check to see if the program flag is set 322. Since it is, the vacuum delay routine is initiated 325. The display 110 will read "PRG VAC DLY" 327 and an old value will be recalled and displayed if it exists 328. Again, the software will return to the scan routine 329. Referring to FIG. 10, depression of the numerical keys 93 determines if the speed flag is set 332, the calculation flag is set 334 or if the program flag is set 336. Since it is, the number is converted to binary coded decimal and stored as the time for the vacuum delay 338 which was discussed above.

To program the film speed the program control 105 is depressed followed by the speed key 101. The central display 110 will say "PROG FILM NO.". A film identification is then entered using the memory keys 1–9.

The left hand LED display 110 will now show the emulsion number entered. The central display 110 will say "PRG SPD RED". The red exposure should then be entered using the numerical keys 93 and the value entered will appear in the right hand display 110.

Referring to FIGS. 8–14, the software is originally in the scan routine of FIG. 14. Depression of the program key sets the program flag 315 as described in connection with FIG. 13. Referring to FIG. 8, since the program flag is set 341, depression of the speed key 101 will cause the CAL flag to be set 343 and the display will read "PRG FILM NUMBER" 345 and the software will return 329 to the scan routine. When the numeric key 93 is depressed, the routine on FIG. 10 will be followed. The speed flag will not be set 332, the CAL flag will be set 334 and "PROG SPEED RED" will then be displayed 339. The CAL flag will be cleared 350 and the software will return to scan 351. Upon subsequent depression of the numerical keys 93 shown in FIG. 10, speed will not be set 332, CAL will not be set 334, PROG will not be set 336. Therefore, the entered number will be stored in a film memory 338.

With the red exposure entered, the cycle key 102 can be depressed. The display 110 will now say "PRG SPD GRN". The green exposure required is then entered and the cycle key 102 is again depressed to enter the blue exposure.

Upon depression of the cycle key 102 with the program flag set 350 and the memory flag not set 352, the color count 356 will be incremented and since the color is less than four 356 the new color, green, will be displayed 358 and the software will return to the scan routine 359. This process will be repeated for the three primary colors. When the fourth pass through the cycle routine is reached, the color will be equal to three 356 but less than four 362 so the display will read "EXPOSE TEST OBJECT" 364 and the subroutine will jump to "GET READY" 366.

The control is now ready to expose a test scale image. To start the exposure, the start key 103 is depressed. When the start key is pressed, the vacuum delay will be initiated. A minimum of three second delay is necessary for lamp warmup. At the end of this delay the shutter is activated for exposure.

Referring to FIG. 13, when the "GET READY" routine 370 is called any override value will be recalled and displayed 373. If no override is present, the display should normally read 0000. An override value can be changed or entered at this time if desired using the numerical keys 93 of FIG. 10. For example, to compensate for an overlay support which has a density of 0.05 enter 5. All exposures can be increased by 0.05 density. The lights will then be turned off 378 and the software will return to the scan routine.

To start the test exposure, the start key 103 shown in FIG. 8 is depressed. When the start key 103 is pressed, the vacuum delay is initiated 379 and a delay or exposure time is entered 382. At the end of the delay, the shutter is activated for exposure. Referring to FIG. 14, timing of the process is achieved with the IRQ timer attached to the microprocessor U4. An IRQ timer pulse is emitted every 10 milliseconds which decrements the key debounce 390, decrements the beeper 392 which sounds every time a key is depressed, it sets the delay or exposure to 3 seconds if not activiated and then decrements the exposure 396 or decrements the delay 397, when the vacuum delay equals zero the shutter is opened 398, if active. When the exposure equals zero, the shutter is closed 399.

To program an exposure memory, the program key 105 is depressed followed by one of the nine memory numbers 96. The memory numbers selected will appear in the second left hand window 110. The central display will say "FLAT ONE RED" and the right hand display 110 will show the exposure amount previously entered.

Each exposure memory is capable of storing exposures for up to six flats. Each one consisting of a red, green and blue combination.

For each color channel, red, green or blue, the exposure amount required as entered and then the cycle key 102 is depressed all operating in the manner discussed previously. When cycle key 102 is depressed after the blue entry, the flat number will be incremented and a new flat number will be displayed 402 as well as the next color, i.e. red, for flat number 2. In this manner, all entries can be made until all 6 flats have been programmed. Normally, all 6 flats will not be required and flat numbers not intended for use should contain zero. It is, therefore, advisable to use the clear command 104 to clear a memory prior to programming. The clear routine is shown in FIG. 11 and will clear all values in any memory sequence 96 chosen.

After the apparatus is programmed, exposures can be made.

To select an emulsion or film number depression of the speed key 101, discussed in conjunction with FIG. 8, without the program flag set 341 causes the display to indicate "FILM NUMBER?" 404. Depression of the numerical keys 93 of FIG. 10 causes the program speed to be checked. Selection of an exposure memory shown in FIG. 13 causes the first flat of that memory to be displayed 410, causes the override to be displayed 393 and turns off the lights 378. An override value can be added 374 using the numerical keys 93 and this value will be added to all program values automatically.

To start the exposure the start key 103 shown in FIG. 8 is depressed, the vacuum delay is started 379 and the exposure is calculated 352. Calculation of the exposure is shown in FIG. 9 and includes monitoring of the actual illumination or intensity produced by the lamps in a logarithmic feedback arrangement at a fixed exposure time.

For each exposure a calculation is made as to the amount of red, green and blue light to be used. In essence, the calculation adds to the target value, the film speed plus the override value less a fixed offset. These values are stored as red, green and blue values. The offset is an arbitrary value, which can be fixed a 250 units, used to adjust for differing film speeds and to assure that the exposure remains under the maximum exposure range. The 60 cycle interrupt shown in FIG. 11 designated NMI 411 then causes the photometer routine to read the photometer count and when the count value equals the calculated value, the actual log intensity of the light has been achieved. Because a fixed exposure time is used, the amount of illumination is determined by the phase control of the lamps so that each lamp is energized only during a portion of each 60 cycle of the 60 hertz operating voltage.

The calculations are based on the recipe values, the entered red, green and blue exposures for each color memories 1-9 and flats 1-6 for each. Referring to FIG. 9, the recipe value is converted to hexidecimal 412 and the film speed is added to that value 415 and the offset is subtracted from that value 418 to create the target red, green and blue values to be mixed in the light chamber. The calculate routine 411 cycles through all three colors 421 and when all three colors have been calculated the photometer is set to begin 425.

The photometer value is read 430. Since the photometer counter U11 were originally set at FFFF and the logrithmic pulse train from logrithmic amplifiers U1-U3 decrements the counter U11, the compliment (FFFF—the counter counts) is derived 440. Its difference from maximum count 8333, is calculated 445. The maximum count less the photometer count is the actual log intensity of the light that has been received for purposes of the exposure.

From this is subtracted the target count 450, and the present phase count 452 is added, the portion of each 60 cycle that the lamp will be energized. If the resulting phase count is greater than the minimum phase 454, that "new" phase count is stored in the counter 458. If the phase count is less than the minimum phase achievable, the minimum phase is used 460. This provides a continuing logarithmic feedback of light intensity. If the photometer count is high (measuring too much light is being received) the calculation at 450 is positive and is added to the present phase count 454. This higher value is stored as the new phase count 454. Since the phase count is higher it results in a longer time period to energize the lights into the sixty cycle phase and as a consequence the light(s) get dimmer or less intense. A similar result occurs if not enough light is being received.

This count is stored for all three color counters 464 and is used to control the intensity of the light through the predetermined exposure time. As the timer routine 389 cycles the microprocessor U4 as shown in FIG. 14, the exposure time is decremented 396 until the exposure time equals the zero 470. When the exposure is complete, the shutter is closed 399 and timing for the next flat 475 is initiated.

In this manner a very precise intensity of light varying colors is created with a fixed exposure time for purposes of the invention.

While all of the possible variations and permutations of the software have not been described it will be clear from those skilled in the art upon a review of FIGS. 8-14 and the referenced microfiche appendix that the invention is particularly and well suited for the purposes of invention and there are many and varied alternatives that can be employed. As mentioned above, as many as seven flats can be utilized to add, in addition to the basic color and position proof, cut and fold lines to the exposure and the like.

While a specific preferred embodiment of the invention has been discussed and disclosed, there are alternates which are available and are intended to be within the intendment and scope of the invention. For example, while a light sensitive emulsion has been disclosed in the preferred embodiment, a diode array can also be used as the light sensitive medium and sensed light intensity values stored for processing. Also, while three lamps have been disclosed with three separate filters, a single light source or lamp with a composite filter may be used as well. For example, a three sector filter, each sector big enough to accept all of the light beam, is possible. The composite filter would normally be placed in the light beam so that the center of the beam coincides with the point where all three sectors join with the light being mixed in a small chamber after the filter. In such an embodiment, the color of the exposing light can be varied by moving the composite filter vertically and/or horizontally so that more or less of each of the sectors are exposed to the light beam. Colors of the exposure would thus be controlled by controlling the X-Y position of the composite filter in front of the light beam and the light intensity or density of exposure could be controlled by adjusting the intensity of the lamp or the duration of the exposure time. Other more mechanical and manual techniques can be used as well. These and other variations will become obvious to those skilled in the art and each embodiment which falls within the scope of the appended claims is within the intendment of the invention.

We claim:

1. A color and position proof lighting system for exposing a light sensitive medium comprising:
   a light integrating chamber for mixing light of different spectral values:
   a light course positioned adjacent to and directed into the integrating chamber to provide the light of different spectral values;
   color filter means interposed between the light source and the integrating chamber to create the filtered light having the different spectral values;
   means for determining the desired amount of illumination for each spectral value;
   means for measuring the amount of illumination of each spectral value; and
   control means for continuously controlling illumination of the light source so that the desired amount of filtered light of each spectral value from the light source is directed onto the light sensitive medium
   said control means including means for balancing the dominance of any one of said spectral values relative to the other spectral values.

2. A color acceptance and position proof lighting system for exposing a light sensitive emulsion comprising:
   a light integrating chamber for mixing light of different spectral values;
   a light source comprising a plurality of lamps positioned adajcent to and directed into the integrating chamber to provide the light of different spectral values;
   color filter means interposed between each lamp and the integrating chamber to create the filtered light having the different spectral values;
   means for determining the desired amount of illumination from each filtered lamp;
   means for measuring the amount of illumination of each spectral value; and
   phase control means for continuously controlling the illumination of each lamp so that the desired amount of filtered light from each lamp is directed onto the light sensitive emulsion, said control means including means for balancing the dominance of any one of said spectral values relative to the other spectral values.

3. The invention of claim 2 wherein the phase control of light controls the light intensity with a fixed exposure time.

4. The invention of claims 1 or 2 wherein the filter means are glass interference filters.

5. The invention of claims 1 or 2 wherein the filter means are narrow bandpass filters to enhance the clarity of color and minimize contamination of other color values.

6. The invention of claims 1 or 2 wherein an inverse cosign attenuator is interposed between the light integrator and the light sensitive emulsion.

7. The invention of claims 1 or 2 wherein the light source further comprises a shutter mechanism.

8. The lighting system of claims 1 or 2 wherein the means for measuring the amount of illumination of each spectral value comprises means for digitizing the amount of illumination.

9. The invention of claims 1 or 2 wherein the means for controlling the amount of illumination comprises a logrithmic feedback circuit connected to the means for measuring the amount of illumination of each spectral value.

10. The improvement of claim 2 wherein the invention comprises processing means for calculating the correct amount of exposure for each lamp and for continuously calculating the amount of exposure from each lamp.

11. The improvement of claim 10 wherein the means for measuring the illumination from each filtered color comprises frequency generating means, the number of pulses from which directly relates to the illumination of the lamp and first counting means counting the pulses relating to the illumination of the lamp and wherein the phase control means comprises second counting means counting the amount of desired illumination from the lamps and wherein the processing means comprises means for comparing the counting means so that the phase control means can provide the desired amount of illumination from each filtered lamp.

12. The improvement of claim 10 wherein the processing means further comprises memory means and wherein the proof lighting system further comprises a plurality of flats to be placed over the light sensitive emulsion and data input means, the memory means being programmable by the data input means to store the desired amount of illumination from each filtered lamp for the plurality of flats and wherein the processing means is programmed to selectively illuminate the lamps with the desired amount of illumination for each flat being exposed.

13. The proof lighting system of claims 1 or 2 wherein the control means comprises means for logarithmically controlling illumination of the light source so that there is a linear relationship of light intensity to the color response of the light sensitive emulsion.

14. The proof lighting system of claims 1 or 2 wherein the system further comprises an inverse cosign filter positioned between the light source and the light sensitive emulsion to assure uniform lighting over the entire proof.

15. The proof lighting system of claims 1 or 2 wherein the system further comprises means for disbursing static electricity.

16. The proof lighting system claims 1 or 2 wherein the system further comprises display means for sequentially displaying the status of operation of the proof lighting system.

17. The proof lighting system of claims 1 or 2 wherein the system further comprises a nonvolatile memory means for permanently storing color values for a plurality of light sensitive emulsions.

18. The proof lighting system of claims 1 or 2 wherein the system further comprises data entry means for entering the selected color value to be achieved on the light sensitive emulsion.

19. The proof lighting system of claims 1 or 2 wherein the system further comprises second control means for controlling the room light in which the system is installed.

20. The proof lighting system of claims 1 or 2 wherein the system further comprises vacuum frame control means for automatically controlling the vacuum frame in which the light sensitive emulsion is placed.

21. The proof lighting system of claims 1 or 2 wherein the proof lighting system further comprises means for controlling the light distribution from the light source to focus solely on the light sensitive emulsion.

* * * * *